(12) United States Patent
Gholami et al.

(10) Patent No.: US 7,995,888 B2
(45) Date of Patent: Aug. 9, 2011

(54) MULTIMODE OPTICAL FIBERS

(75) Inventors: Asghar Gholami, Isfahan (IR); Denis Molin, Draveil (FR); Pierre Sillard, Le Chesnay (FR); Yves Lumineau, Herblay (FR)

(73) Assignee: Draka Comteq, B.V., Amsterdam (NL)

( * ) Notice: Subject to any disclaimer, the term of this patent is extended or adjusted under 35 U.S.C. 154(b) by 210 days.

(21) Appl. No.: 12/498,439

(22) Filed: Jul. 7, 2009

(65) Prior Publication Data

US 2010/0028020 A1 Feb. 4, 2010

(30) Foreign Application Priority Data

Jul. 8, 2008 (FR) .................................... 08 03873

(51) Int. Cl.
*G02B 6/00* (2006.01)
*G02B 6/02* (2006.01)
(52) U.S. Cl. ........................... 385/122; 385/123; 398/81
(58) Field of Classification Search .................. None
See application file for complete search history.

(56) References Cited

U.S. PATENT DOCUMENTS

| | | | |
|---|---|---|---|
| 4,111,525 A | 9/1978 | Kaminow et al. | |
| 4,184,744 A | 1/1980 | Onoda et al. | |
| 4,229,070 A | 10/1980 | Olshansky et al. | |
| 4,230,396 A | 10/1980 | Olshansky et al. | |
| 4,339,174 A | 7/1982 | Levin | |
| 4,465,335 A | 8/1984 | Eppes | |
| 4,636,235 A | 1/1987 | Glessner et al. | |
| 4,636,236 A | 1/1987 | Glessner et al. | |
| 4,715,695 A | 12/1987 | Nishimura et al. | |
| 4,723,828 A | 2/1988 | Lowe et al. | |
| 4,838,643 A | 6/1989 | Hodges et al. | |
| 5,142,603 A | 8/1992 | Forrester | |
| 5,278,687 A | 1/1994 | Jannson et al. | |
| 5,381,503 A | 1/1995 | Kanamori et al. | |
| 5,574,816 A | 11/1996 | Yang et al. | |
| 5,702,497 A | 12/1997 | Oh et al. | |
| 5,717,805 A | 2/1998 | Stulpin | |
| 5,761,362 A | 6/1998 | Yang et al. | |
| 5,841,933 A | 11/1998 | Hoaglin et al. | |
| 5,911,023 A | 6/1999 | Risch et al. | |
| 5,982,968 A | 11/1999 | Stulpin | |
| 6,002,818 A | 12/1999 | Fatehi et al. | |
| 6,035,087 A | 3/2000 | Bonicel et al. | |
| 6,066,397 A | 5/2000 | Risch et al. | |

(Continued)

FOREIGN PATENT DOCUMENTS

EP    1101744 A3    5/2001

(Continued)

OTHER PUBLICATIONS

Sasaki, P.L. Francois, D.N. Payne, "Accuracy and resolution of preform index-profiling by the spatial-filtering method," ECOC'81, 6.4-1, Copenhagen, Denmark.

(Continued)

*Primary Examiner* — Charlie Peng
*Assistant Examiner* — Mary A El-Shammaa
(74) *Attorney, Agent, or Firm* — Summa, Additon & Ashe, P.A.

(57) ABSTRACT

A multimode optical fiber has an equivalent modal dispersion value ($DMD_{inner\&outer}$) of less than 0.11 ps/m for ($\Delta\lambda_{max} \times D$) >0.07 ps/m as measured on a modified DMD graph. The modified DMD graph accounts for chromatic dispersion to ensure that the multimode optical fiber has a calculated effective bandwidth EBc greater than 6000 MHz-km when used with multimode transverse sources.

15 Claims, 4 Drawing Sheets

U.S. PATENT DOCUMENTS

| | | |
|---|---|---|
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,210,802 B1 | 4/2001 | Risch et al. |
| 6,215,931 B1 | 4/2001 | Risch et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,363,195 B1 | 3/2002 | Abbott, III et al. |
| 6,381,390 B1 | 4/2002 | Hutton et al. |
| 6,422,043 B1 | 7/2002 | DiGiovanni et al. |
| 6,470,126 B1 | 10/2002 | Mukasa |
| 6,493,491 B1 | 12/2002 | Shen et al. |
| 6,525,853 B1 | 2/2003 | Stuart |
| 6,542,679 B2 | 4/2003 | DiGiovanni et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,790,529 B2 | 9/2004 | Pleunis et al. |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,139,457 B2 | 11/2006 | Guan et al. |
| 7,162,128 B2 | 1/2007 | Lovie et al. |
| 7,242,870 B2 | 7/2007 | Guan et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,406,235 B2 | 7/2008 | Guan et al. |
| 7,421,172 B2 | 9/2008 | Matthijsse et al. |
| 7,421,174 B2 | 9/2008 | Fleming, Jr. et al. |
| 7,483,613 B2 | 1/2009 | Bigot-Astruc et al. |
| 7,515,795 B2 | 4/2009 | Overton et al. |
| 7,539,381 B2 | 5/2009 | Chen et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,724,998 B2 | 5/2010 | Parris et al. |
| 7,783,149 B2 | 8/2010 | Fini |
| 7,787,731 B2 | 8/2010 | Bookbinder et al. |
| 7,817,891 B2 | 10/2010 | Lavenne et al. |
| 7,826,691 B2 | 11/2010 | Matthijsse et al. |
| 7,889,960 B2 | 2/2011 | de Montmorillon et al. |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0042799 A1 | 3/2004 | Sardesai et al. |
| 2004/0184492 A1 | 9/2004 | Windover |
| 2005/0008312 A1 | 1/2005 | Jang et al. |
| 2007/0172182 A1 | 7/2007 | Lee et al. |
| 2008/0292262 A1 | 11/2008 | Overton et al. |
| 2009/0059353 A1 | 3/2009 | Fini |
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279835 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0171945 A1 | 7/2010 | Gholami et al. |
| 2010/0220966 A1 | 9/2010 | Bennett |
| 2010/0254653 A1 | 10/2010 | Molin et al. |
| 2010/0310218 A1 | 12/2010 | Molin et al. |
| 2011/0044595 A1 | 2/2011 | Sillard et al. |
| 2011/0058781 A1 | 3/2011 | Molin et al. |
| 2011/0064367 A1 | 3/2011 | Molin et al. |

FOREIGN PATENT DOCUMENTS

| | | |
|---|---|---|
| EP | 1498753 A2 | 1/2005 |
| EP | 1921478 A1 | 5/2008 |
| EP | 2144096 A1 | 1/2010 |
| JP | 08-304636 A | 11/1996 |
| JP | 11-064665 A | 3/1999 |
| JP | 2003-47057 A2 | 12/2000 |
| JP | 2002-318315 A | 10/2002 |
| JP | 2006-047719 A | 2/2006 |
| JP | 2006-078543 A | 3/2006 |
| JP | 2006-227173 A | 8/2006 |
| WO | 03/025645 A2 | 3/2003 |
| WO | 03/081301 A1 | 10/2003 |
| WO | 2005/106544 A1 | 11/2005 |
| WO | 2007/013923 A2 | 2/2007 |
| WO | 2009/062131 A1 | 5/2009 |
| WO | 2009/078962 A1 | 6/2009 |
| WO | 2010/036684 A2 | 4/2010 |

OTHER PUBLICATIONS

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glascow, Scotland, pp. 1-2.

Overton, U.S. Provisional Patent Application No. 60/986,737, "Microbend-Resistant Optical Fiber," Nov. 9, 2007, pp. 1-63.

Overton, U.S. Appl. No. 61/041,484, "Microbend-Resistant Optical Fiber," Apr. 1, 2008, pp. 1-73.

Overton, U.S. Appl. No. 61/112,595, "Microbend-Resistant Optical Fiber," Nov. 7, 2008, pp. 1-317.

De Montmorillon et al., U.S. Appl. No. 61/101,337, "Bend-Insensitive Optical Fiber," Sep. 30, 2008, pp. 1-62.

De Montmorillon et al., U.S. Appl. No. 61/112,006, "Bend-Insensitive Single-Mode Optical Fiber," Nov. 6, 2008, pp. 1-63.

De Montmorillon et al., U.S. Appl. No. 61/112,374, "Bend-Insensitive Optical Fiber," Nov. 7, 2008, pp. 1-73.

European Search Report in counterpart European Application No. 09075278 dated Oct. 9, 2009, pp. 1-6.

Yam et al., "High-Speed Data Transmission Over a 1 KM Broad Wavelength Window Multimode Fiber," Optics Letters, OSA, Optical Society of America, Washington, DC, vol. 31, No. 13, Jul. 1, 2006, pp. 1954-1956.

French Search Report in counterpart French Application No. 0803873 dated Apr. 3, 2009, pp. 1-6.
Chakma, "Optical Signal to Noise Ratio (OSNR)," International University Bremen, (2005), pp. 1-18.
Gloge et al., "Multimode theory of graded-core fibers," Bell System Technical Journal 1973, pp. 1563-1578.
Yabre, "Comprehensive theory of dispersion in graded-index optical fibers," Journal of Lightwave Technology, Feb. 2000, vol. 18, No. 2, pp. 166-177.
Panicker et al., "10×10 Gb/s DWDM transmission through 2.2-km multimode fiber using adaptive optics," IEEE Photonics Technology Letters, vol. 19, No. 15, pp. 1154-1156 published Aug. 1, 2007.

(COMPARATIVE)

(COMPARATIVE)

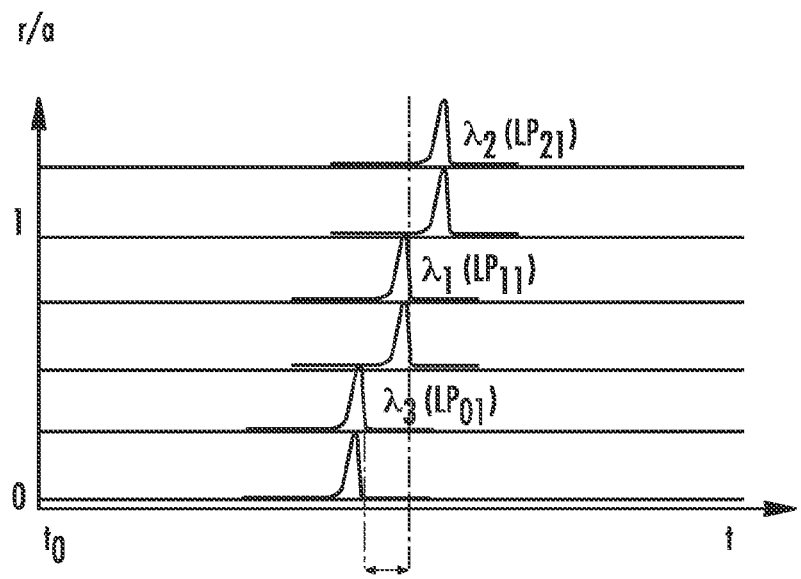
FIG. 3 (COMPARATIVE)
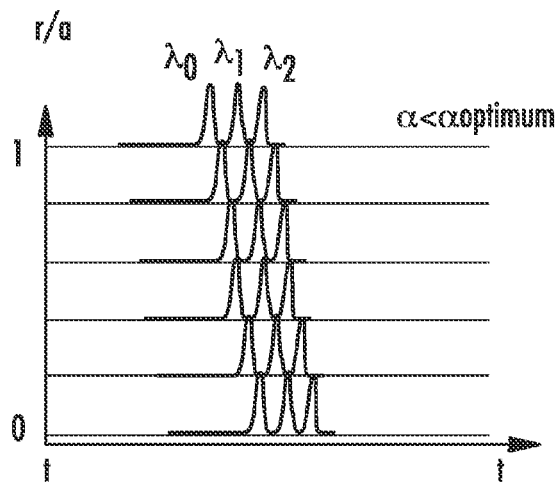
FIG. 4
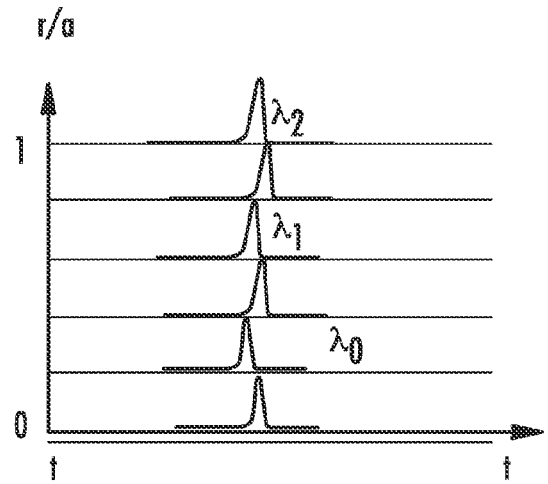
FIG. 5

MULTIMODE OPTICAL FIBERS

CROSS-REFERENCE TO PRIORITY APPLICATION

This application claims the benefit of pending French application Ser. No. 08/03873 for "Fibres Optiques Multimodes" (filed Jul. 8, 2008, at the French Patent Office), which is hereby incorporated by reference in its entirety.

FIELD OF THE INVENTION

The present invention relates to the field of optical fiber transmissions, and more specifically, to multimode fibers used for short-distance optical transmission systems that require large bandwidth.

BACKGROUND OF THE INVENTION

Multimode optical fibers are used for short-distance applications and local networks. The core of a multimode fiber generally has a diameter of approximately 50 microns (μm) and a numerical aperture greater than 0.2. By way of comparison, a single-mode fiber generally has a diameter of approximately 8 to 9 microns (μm) and a numerical aperture greater than 0.12. Thus, for a particular wavelength, several optical modes propagate simultaneously along the fiber, carrying the same information. The bandwidth is directly linked to the group velocity of the optical modes propagating in the multimode core of the fiber. To guarantee a high bandwidth, it is necessary for the group velocities of all the modes to be identical. In other words, the intermodal dispersion (i.e., the difference in group velocity between the slower mode and the faster mode) should be minimized for a particular wavelength. The multimode fibers have been the subject of international standardization under standard ITU-T G.651, which, in particular, defines criteria (e.g., bandwidth, numerical aperture, and core diameter) that relate to the requirements for optical fiber compatibility. The standard ITU-T G.651 is hereby incorporated by reference in its entirety.

To reduce the intermodal dispersion in a multimode fiber, it has been proposed since the 1970s to produce graded-index fibers with a parabolic core profile. Such an optical fiber has been used for many years and its characteristics have been described in particular in the publications "*Multimode Theory of Graded-Core Fibers*" by D. Gloge et al., Bell System Technical Journal 1973, pp. 1563-1578, and "*Pulse Broadening in Graded-Index Optical Fibers*" by Olshansky et al., Applied Optics, Vol. 15, No. 2, February 1976. Each of these publications is hereby incorporated by reference in its entirety.

A graded-index profile can be defined by a relationship between the index value n at a point as a function of the distance r from this point to the center of the fiber:

$$n = n_1 \sqrt{1 - 2\Delta\left(\frac{r}{a}\right)^\alpha}$$

wherein, $\alpha \geq 1$;

$n_1$ is the maximum index of the multimode core;

a is the radius of the multimode core; and $$\Delta = \frac{(n_1^2 - n_0^2)}{2n_1^2}$$

wherein, $n_0$ is the minimum index of the multimode core, generally corresponding to the index of the cladding (most often made of silica).

A multimode fiber with a graded index therefore has a core profile with a rotational symmetry such that along any radial direction the value of the index decreases continuously from the center of the fiber to its periphery. These curves are generally representative of the theoretical or target profile of the optical fiber, though fiber-manufacturing constraints may lead to a slightly different profile.

When a light signal propagates in such a core having a graded-index, the different modes experience a different propagation medium, which affects their speed of propagation differently. By adjusting the value of the parameter α, it is therefore possible to theoretically obtain a group velocity that is virtually equal for all the modes and thus a reduced intermodal dispersion for a particular wavelength. A value for the parameter α of between 1.8 and 2.2 generally allows a satisfactory limitation of the modal dispersion.

That said, an optimum value of the parameter α is valid only for a particular wavelength. Thus, a multimode fiber typically transmits a monochromatic optical signal having a particular wavelength for which the alpha (α) profile of the fiber has been optimized. U.S. Pat. No. 6,363,195, which is hereby incorporated by reference in its entirety, proposes to compensate for the modal dispersion of a multimode optical link by using a concatenation of multimode fibers in order to optimize the bandwidth for two transmission windows, one centered on 850 nanometers and the other on 1300 nanometers. This patent proposes to use a length of a first multimode fiber having a value of parameter $\alpha_1$ of between 0.8 and 2.1 to optimize the bandwidth at 850 nanometers and a length of a second multimode fiber having a value of parameter $\alpha_2$ between the first value $\alpha_1$ and 8 to optimize the bandwidth at 1300 nanometers.

Furthermore, the exact parameter value α is difficult to control during fiber manufacturing. In order to compensate the profile deviations from a theoretical profile having an optimum value α, U.S. Pat. No. 7,139,457 proposes a concatenation of multimode fibers. The alpha (α) profile of each fiber and the length of each fiber are optimized in order to maximize the bandwidth over a given optical link. U.S. Pat. No. 7,139,457 is hereby incorporated by reference in its entirety.

Using fiber concatenations for modal dispersion compensation leads to more complex and more costly optical systems. Moreover, the foregoing documents are not concerned with the spectral dispersion of the sources used.

In this regard, the sources used in optical transmission systems are not generally monochromatic. By way of example, the widely used vertical-cavity, surface-emitting diode lasers (VCSEL) have a wide-spectrum discrete emission. The VCSELs used in high-speed transmissions are generally longitudinally, but not transversally, single mode. Each transverse mode of the laser has its own wavelength corresponding to the various peaks of the emission spectrum (i.e., the emission spectrum has a spatial dependence).

Accordingly, a multimode fiber has an alpha profile with a value of parameter α optimized only for a given wavelength. Thus, the introduction of a polychromatic optical signal originating from a transverse multimode source in a multimode fiber causes the appearance of a modal dispersion and consequently a reduction in the bandwidth.

U.S. Patent Publication No. 2004/0184492, which is hereby incorporated by reference in its entirety, proposes to use only one single transverse mode of a VCSEL source by conditioning the emitted signal before its introduction into the multimode fiber. This signal conditioning is achieved by diffractive elements and/or by offsetting the VCSEL output from the center of the multimode fiber. However, such a conditioning of the signal at the input of the multimode fiber involves a significant degradation of the signal modulation and consequently an increase in the bit error rate (BER).

U.S. Patent Publication No. 2005/0078962, which is hereby incorporated by reference in its entirety, proposes to offset the VCSEL output from the center of the multimode fiber in order to introduce the signal into a "large bandwidth zone." Such an offsetting, however, is difficult to control and has to be adjusted for each fiber. Moreover, it may introduce a power loss, which is detrimental to the transmission quality.

Thus, there is a need for a multimode optical fiber that has a reduced modal dispersion when used with a transverse polychromatic and multimode source without requiring conditioning or offsetting of the signal emitted by the source.

SUMMARY OF THE INVENTION

To this end, the invention proposes to use the chromatic dispersion of the multimode optical fiber to compensate for the modal dispersion induced by a polychromatic signal.

In fact, a multimode fiber typically has chromatic dispersion on the order of −100 ps/(nm·km) at a wavelength of 850 nanometers. The chromatic dispersion can vary between about −80 and −120 ps/(nm·km) in the 840-nanometer to 860-nanometer spectral range. Such chromatic dispersion will induce a modal dispersion by further delaying the optical fiber's higher order modes, which have shorter wavelengths; the higher order modes are mainly excited by the transverse modes having the greatest divergences and therefore also the shorter wavelengths. This dispersion is independent of the modal dispersion because the chromatic dispersion depends on the material whereas the modal dispersion depends on the profile of the fiber.

The invention, therefore, proposes to modify the profile of a multimode fiber by adjusting the value of parameter α to a value different from optimum in order to introduce a modal dispersion that will compensate within the same fiber, the modal dispersion induced by the chromatic dispersion when a transverse polychromatic and multimode source is used.

The present invention relates specifically to a multimode optical fiber having a refractive index profile chosen in such a manner that a measurement of the dispersion modal delay (DMD), the DMD graph of which has been modified by adding a delay ($\Delta t_{trace}$) to each trace:

$$\Delta t_{trace} = \Delta \lambda_{max} \times D \times L \left( \frac{r_{trace}}{a} \right)^{\beta}$$

wherein,
$r_{trace}$ is the center position of the injection of the light pulse corresponding to the trace;
a is the core radius of the multimode fiber;
L is the length of the multimode optical fiber;
D is the chromatic dispersion of the multimode fiber at the wavelength of the light pulse;
β is the coefficient of the delay; and $\Delta \lambda_{max}$ is the maximum spectral width of a source intended to be used with the fiber,
produces an equivalent modal dispersion value ($DMD_{inner\&outer}$), as measured at a quarter of the height of the leading edge of the first trace and at a quarter of the height of the trailing edge of the last trace, of less than 0.11 ps/m for ($\Delta \lambda_{max} \times D$)>0.07 ps/m.

In one exemplary embodiment, the multimode optical fiber has chromatic dispersion between −80 ps/(nm·km) and −120 ps/(nm·km) for wavelengths between 840 nanometers and 860 nanometers.

The coefficient β of the delay $\Delta t_{trace}$, which is added to each trace, is larger than or equal to 1, typically equal to 1 or 2.

In another exemplary embodiment, the multimode optical fiber has a calculated effective bandwidth (EBc) greater than 6000 MHz·km.

The present invention also proposes an optical system that includes a polychromatic optical source emitting multiple transverse modes with a maximum spectral width ($\Delta \lambda_{max}$) and an optical link, which is formed from a portion (e.g., a fiber segment) of at least one multimode optical fiber according to the present invention.

According to another exemplary embodiment, the maximum spectral width of the source ($\Delta_{\lambda max}$) is between 1 nanometer and 2 nanometers.

According to other exemplary embodiments, the source is a surface-emitting laser (VCSEL) or a light-emitting diode (LED).

According to another exemplary embodiment, the optical system has a distance by Gigabit Ethernet rate product greater than 3000 Gb/s·m.

The present invention also relates to a method for selecting multimode optical fibers. In this regard, multimode optical fibers, which have a graded-index profile with a given value of parameter α, are manufactured. Dispersion modal delay is measured for each multimode optical fiber from respective DMD graphs. The modal dispersion ($DMD_{inner\&outer}$) is measured at a quarter of the height of the leading edge of the first trace and at a quarter of the height of the trailing edge of the last trace.

The respective DMD graphs are then modified by adding a delay ($\Delta t_{trace}$) to each trace according to the following equation:

$$\Delta t_{trace} = \Delta \lambda_{max} \times D \times L \left( \frac{r_{trace}}{a} \right)^{\beta}$$

wherein
$r_{trace}$ is the center position of the injection of the light pulse corresponding to the trace;
a is the core radius of the multimode fiber;
D is the chromatic dispersion of the multimode fiber at the wavelength of the light pulse;
$\Delta \lambda_{max}$ is the maximum spectral width of a source intended to be used with the fiber.

Those multimode optical fibers with an equivalent modal dispersion value measured on the modified DMD graph of less than 0.11 ps/m are then selected.

The foregoing, as well as other characteristics and advantages of the invention and the manner in which the same are accomplished, are further specified within the following detailed description and its accompanying drawings.

BRIEF DESCRIPTION OF THE DRAWINGS

FIG. 3 graphically represents a DMD graph for an optical fiber according to the prior art with a polychromatic source having three emitted wavelengths.

FIG. 4 graphically represents a DMD graph for an optical fiber according to the invention with three monochromatic sources having three different wavelengths.

FIG. 5 graphically represents a DMD graph for an optical fiber according to the invention with a polychromatic source having three emitted wavelengths.

DETAILED DESCRIPTION

In this regard, the invention proposes an optimized multimode optical fiber for use with a polychromatic source, such as a VCSEL laser, having several transverse modes.

Figure 1:
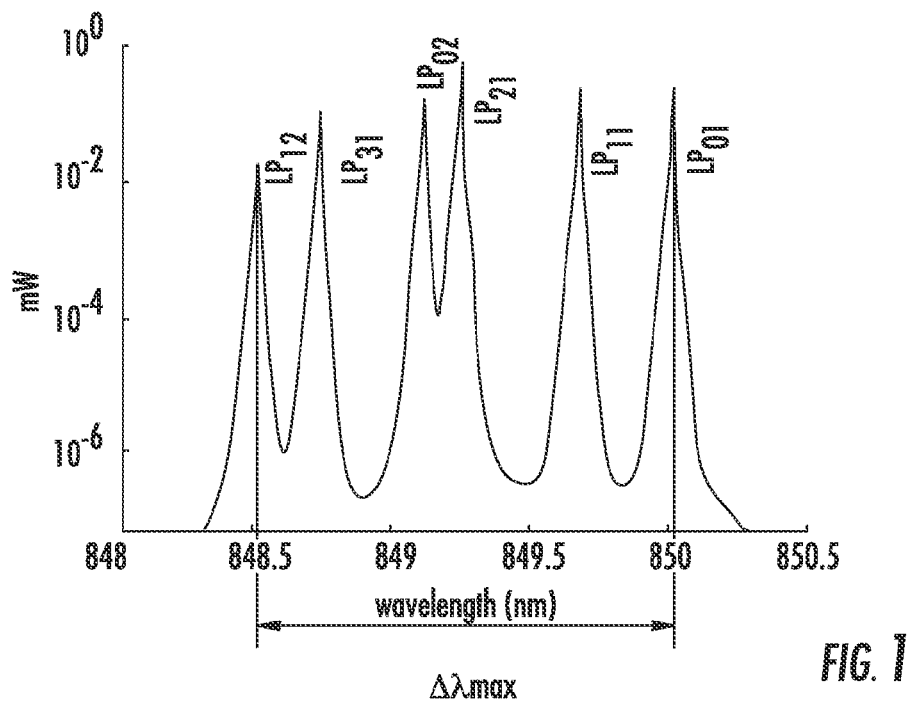
FIG. 1 graphically represents an emission spectrum of a VCSEL laser.

FIG. 1 shows an emission spectrum of a VCSEL laser, with a mode centered on 850 nanometers for the excitation of the fundamental mode LP01. FIG. 1 shows that each transverse mode of the laser has its own wavelength. The maximum RMS (Root Mean Square) spectral width generally authorized for high-speed transmission is 0.46 nanometers RMS for the VCSEL (as defined in the standard IEEE 802.3ae).

In this regard, when the optical signal emitted by the VCSEL is introduced into the multimode fiber, each transverse mode of the VCSEL diffracts differently. The transverse modes of the highest order diverge more rapidly (i.e., due to their phase and spatial distribution of their energy), and will therefore be coupled more specifically in the high order modes of the fiber. Those having ordinary skill in the art will appreciate that the high order modes of the VCSEL occupy the lowest wavelengths in the spectrum. This spectral and spatial distribution of the VCSEL modes results in the highest order modes of the fibers mostly carrying the lowest wavelengths in the spectrum. Therefore, the chromatic dispersion will further delay the higher order modes relative to the delay of the fundamental mode.

The chromatic dispersion will thus introduce a modal dispersion referred to as "Modal and Chromatic Dispersion Interferences" (MCDI) resulting in a limitation of the bandwidth.

The modal dispersion induced by the chromatic dispersion can be expressed according to the following equation:

$$\Delta\tau = 2 \times \Delta\lambda_{RMS} \times D \times L$$

wherein, $\Delta\tau$ is the modal dispersion of the light pulse;

$\lambda_{RMS}$ is a half-width of the emission spectrum of the source;

D is the chromatic dispersion in the multimode fiber, typically −100 ps/(nm·km) at 850 nanometers; and L is the length of the multimode fiber considered.

To date, high-bitrate transmission Ethernet networks are in operation, with bitrates of the order of 10 GbE (10 Gb/s). To provide such bitrates over more than 300 meters and 550 meters, respectively, it is necessary to guarantee an effective bandwidth greater than or equal to 2000 MHz·km and 4700 MHz·km, respectively. The standard TIA-492AAAC-A standardizes the required performances for 50-micron, high-bitrate multimode fibers. In the case of multimode fibers, however, the bandwidth depends on the source used. The effective modal bandwidth (EMB) corresponds to the bandwidth of the source-fiber pair when the chromatic dispersion is disregarded. The effective bandwidth (EB) corresponds to the bandwidth of the fiber when both the modal dispersion and the chromatic dispersion are taken into account.

In this regard, the effective modal bandwidth (EMB) is determined by a measurement of the delay caused by the modal dispersion, known as "Dispersion Mode Delay" (DMD) graphical representation. The procedure for measuring the DMD is the subject of standardization, such as IEC 60793-1-49 and FOTP-220, each of which is hereby incorporated by reference in its entirety. To carry out this EMB measurement, care is generally taken to use a source or a fiber length such that the chromatic dispersion is actually negligible; the purpose is to characterize the modal dispersion of the fiber.

A DMD graphical representation is obtained by injecting a light pulse having a particular wavelength $\lambda_0$ at the center of the fiber and measuring the pulse delay after a particular fiber length L. The introduction of the light pulse of particular wavelength $\lambda_0$ is radially offset to cover the entire core of the multimode fiber. When the parameter α is set to an optimum value ($\alpha_{optimum}$), there is virtually no shift in the light pulse delay for a particular wavelength $\lambda_0$ regardless of the injection point of the pulse along the radius r of the fiber core; the intermodal dispersion is low and the effective bandwidth high.

However, this alignment on the DMD graphical representation of the light pulse delays, regardless of the radius r, is only valid for a particular wavelength $\lambda_0$ for a particular value of the parameter α (i.e., $\alpha_{optimum}$).

Figure 2A:
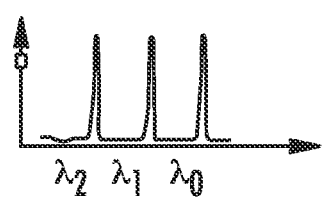
FIG. 2A illustrates the basic scheme of the optical spectrum for a source with three modes.
Figure 2B:
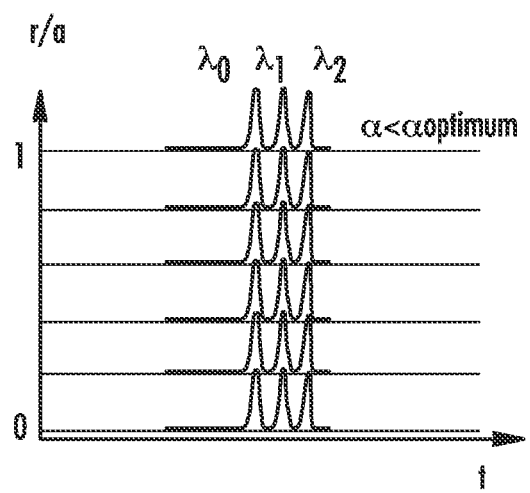
FIG. 2B graphically represents three DMD graphs for an optical fiber according to the prior art with three monochromatic sources having three different wavelengths.

FIG. 2A illustrates the basic scheme of the optical spectrum for a source with three modes. FIG. 2B illustrates three diagrams of DMD graphs of a multimode fiber according to the prior art. The DMD graphs correspond to three sources having three different wavelengths as measured according to the recommendations of standards IEC 60793-1-49 and FOTP-220.

FIG. 2B clearly shows that each pulse has the same delay after a given length of fiber regardless of the radial injection point of the signal (r/a). The modal dispersion is therefore virtually zero for a given signal wavelength. However, the graph in FIG. 2B also shows that the pulses do not have the same delay depending on their wavelength. It is noted that the dependence of the delay and the effective wavelength on the signal is well known and given by the actual definition of chromatic dispersion.

When a polychromatic emission source having several transverse modes is used, a modal dispersion is introduced despite the optimization of parameter α. In this regard, FIG. 3 shows an exemplary diagram of the DMD traces of a multimode fiber according to the prior art. The source presents three transverse modes having three distinct wavelengths. (It should be understood that the source could have more than three transverse modes, but the description is limited to three for clarity of the disclosure.)

FIG. 3 clearly shows that after propagation over a distance L, the delay of the LP01 mode of the VCSEL is not the same as the delay of the VCSEL's LP11 mode or LP21 mode. The different propagation times between the VCSEL modes constituting the optical signal, even with an optimized value of parameter α for a reduced modal dispersion, occurs because the different modes do not have exactly the same propagation wavelength. Consequently, the chromatic dispersion of the fiber induces an additional difference in group velocity between the fiber modes, which does not appear in a DMD measurement, as it is dependent on the VCSEL spectrum. A modal dispersion is therefore induced in the fiber by the chromatic dispersion (MCDI) when the light signal injected at the input has several transverse modes, each having a different wavelength.

The delay induced by the chromatic dispersion between two transverse modes of fibers with respective wavelengths $\lambda_1$ and $\lambda_0$ is given by the following equation:

$$\Delta \tau = (\lambda_1 - \lambda_0) \times D \times L$$

For a spectral spacing of 1 nanometer and a dispersion of −100 ps/(nm·km), delays of 0.1 ps/m are obtained (i.e., the same order of magnitude as the modal dispersion of a fiber having an EMB of 5000 MHz-km.) The modal dispersion induced in the fiber by the chromatic dispersion (MCDI) is therefore not negligible.

This modal dispersion induced by the chromatic dispersion will be added to the modal dispersion induced by the refractive index profile. It is independent of the profile of the fiber because the chromatic dispersion essentially depends on the material of the optical waveguide.

The invention thus proposes to introduce a modal dispersion into the multimode fiber to compensate for the modal dispersion induced by the chromatic dispersion. The compensation of the modal dispersion is achieved in the same fiber; therefore, there is no concatenation of fibers.

In this regard, the invention proposes to choose a value of parameter α different from the optimum value to introduce a non-zero modal dispersion into the multimode fiber for a given wavelength. In an optical link over which a polychromatic signal propagates, the modal dispersion is then substantially zero.

FIG. 4 shows three diagrams of DMD graphs of a multimode fiber according to the invention. These DMD graphs correspond to three monochromatic sources having three different wavelengths and measured according to the recommendations of standards IEC 60793-1-49 and FOTP-220.

Figure 7:
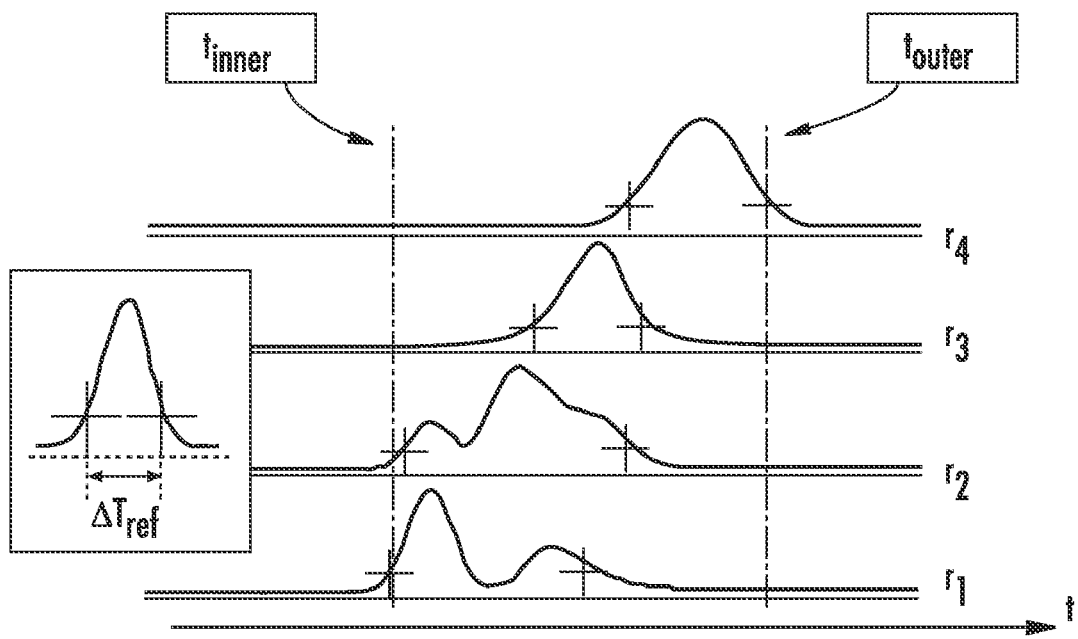
FIG. 7 schematically depicts the calculation of the delay due to the modal dispersion DMD according to the criteria of the standard FOTP-220.

FIG. 7 illustrates a schematic diagram of the calculation of the delay due to the modal dispersion DMD according to the criteria of the standard FOTP-220 as published in its version TIA SCFO-6.6 (Nov. 22, 2002).

A light pulse is injected at different radial positions ($r_1$, $r_2$, $r_3$, $r_4$) with respect to the center of the multimode optical fiber core. The width of the pulse $\Delta T_{ref}$ is measured at a quarter of the height, generally at the output, of the fiber of length L. The delay due to the modal dispersion $DMD_{inner\&outer}$ is then measured between a first point in time $t_{inner}$ at a quarter of the height of the leading edge of the first trace $r_1$, and a second point in time $t_{outer}$ at a quarter of the height of the trailing edge of the last trace $r_4$. The value of $DMD_{inner\&outer}$ is then defined according to the following relationship:

$$DMD_{inner\&outer} = (t_{outer} - t_{inner} - \Delta T_{ref})/L$$

FIG. 4 clearly shows that a modal dispersion was introduced into the fiber according to the invention for a particular wavelength $\lambda_0, \lambda_1, \lambda_2$. This modal dispersion is caused by the graded-index profile, which does not allow the same velocity of propagation for all the modes. This modal dispersion is controlled, however, to compensate for the modal dispersion induced by the chromatic dispersion MCDI in the same fiber when a polychromatic optical signal is propagated.

FIG. 5 shows a DMD graph of a multimode fiber according to the invention with a polychromatic source having three transverse modes having three distinct wavelengths. It is noted that the modal dispersion is then substantially zero; the modal dispersion induced by the chromatic dispersion has been compensated for by the modal dispersion for a given parameter α of the profile.

Figure 6:
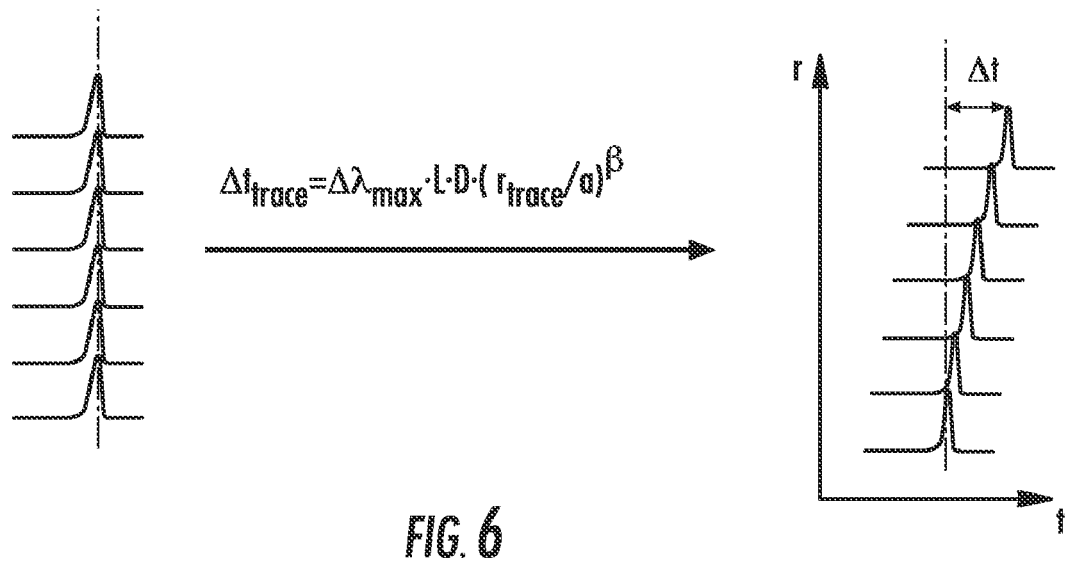
FIG. 6 graphically represents a transformation of the profile of an optical fiber according to the invention compared with a profile having an optimized value of parameter α.

FIG. 6 illustrates the principle of the transformation of the DMD graph for a fiber according to the present invention. The value of parameter α of the fiber according to the present invention is chosen such that the multimode fiber has, at a given wavelength, a dispersion modal delay (DMD) that is controlled at each radial point of the fiber.

The term "delay" $\Delta t$ is used to designate the time lag between (i) a light pulse after propagation over a given length L of fiber at a radial distance r from the center of the fiber and (ii) a light pulse of the same wavelength being propagated over the same length L at the center of the fiber. It should be understood, however, that this "delay" can just as well be an "advance" in that the light pulse being propagated at a radial distance r from the center of the fiber can arrive before the light pulse being propagated at the center of the fiber.

The multimode optical fiber according to the present invention has a graded-index profile with a value of parameter α optimized such that a DMD measurement gives an equivalent modal dispersion value of less than 0.11 ps/m. In this regard, the DMD measurement on a modified DMD graph comports with the standard FOTP-220 with a light pulse duration $\Delta T_{Ref}$ at a quarter of the height at the end of the fiber having length L, such that $\Delta T_{Ref}/L = 0.11$ ps/m.

The term "equivalent modal dispersion" refers to the delay, taking account of the chromatic dispersion, measured starting from a modified DMD graph and calculated according to the method defined in the standard FOTP-220 described with reference to FIG. 7.

In accordance with the foregoing, the DMD graph is modified by adding a delay $\Delta t_{trace}$ to each trace according to the equation:

$$\Delta t_{trace} = \Delta \lambda_{max} \times D \times L \left( \frac{r_{trace}}{a} \right)^\beta$$

wherein, $r_{trace}$ is the center position of the injection of the light pulse corresponding to the trace measured;

a is the core radius of the multimode fiber;

$\Delta \lambda_{max}$ is the maximum spectral width of the source that can be used with the fiber;

D is the chromatic dispersion of the multimode fiber at the emission wavelength of the source; and L is the length of the optical link.

From such a modified DMD graph, the equivalent modal dispersion is calculated according to the equation defined by the standard FOTP-220:

$$DMD_{inner\&outer} = (t_{outer} - t_{inner} - \Delta T_{ref})/L$$

The invention proposes optimizing the value of parameter α of the multimode fiber for applications in which the chromatic dispersion cannot be disregarded (e.g., when the source used is a transverse multimode source and when the fiber length is such that the chromatic dispersion induces a modal dispersion that cannot be ignored). The modification of the DMD graph for calculating an equivalent modal dispersion will be carried out only for source-fiber pairs verifying the equation, $(\Delta\lambda_{max} \times D) > 0.07$ ps/m, (i.e., for fibers intended to be used with sources having a non-negligible spectral width).

The modification of the DMD graph to take account of the chromatic dispersion makes it possible to guarantee a calculated effective bandwidth (EBc) greater than 6000 MHz·km for multimode fibers used with transverse multimode sources.

The coefficient β (of the relationship adding a delay $\Delta t_{trace}$ to each trace of the DMD graph) can be larger than or equal to 1 (e.g., 1 or 2). The delay added to each trace must make it possible to compensate the delay of the edge modes with respect to the central modes induced by the chromatic dispersion. The dispersion modal delay imposed in the fiber by the choice of parameter α compensates for the advance induced by the chromatic dispersion for a given wavelength.

The fiber according to the present invention is optimized for use with a given polychromatic emission source having several transverse modes and for an optical link of a given length.

The maximum spectral width of the source can be between 1 nanometer and 2 nanometers. Most of the commercially available VCSELs have an RMS (Root Mean Square) spectral width, measured as a standard deviation relative to the wavelength of greatest power, between 0 and 0.46 nanometers; a value $\lambda_{RMS}$ of 0.46 nanometers would lead to a maximum spectral width $\Delta\lambda_{max}$ on the order of 2 nanometers.

Multimode fibers are typically used for short-distance applications and local networks. The fiber lengths typically used are between a few meters and several hundred meters. In such a deployment, the modal dispersion induced by the chromatic dispersion remains limited and it is possible to compensate for it by a fiber profile with an optimized graded-index.

Testing has shown that the fiber according to the present invention has surprisingly better system performance when the chromatic dispersion is non-negligible. Tests have been carried out with a source having an RMS spectral width of 0.33 nanometer and a multimode fiber having a length of 750 meters. The effective bandwidths (EBc) calculated after modification of the DMD graph according to the present invention are effectively better correlated with the system performance than are the effective modal bandwidths (EMBc).

Figure 8:
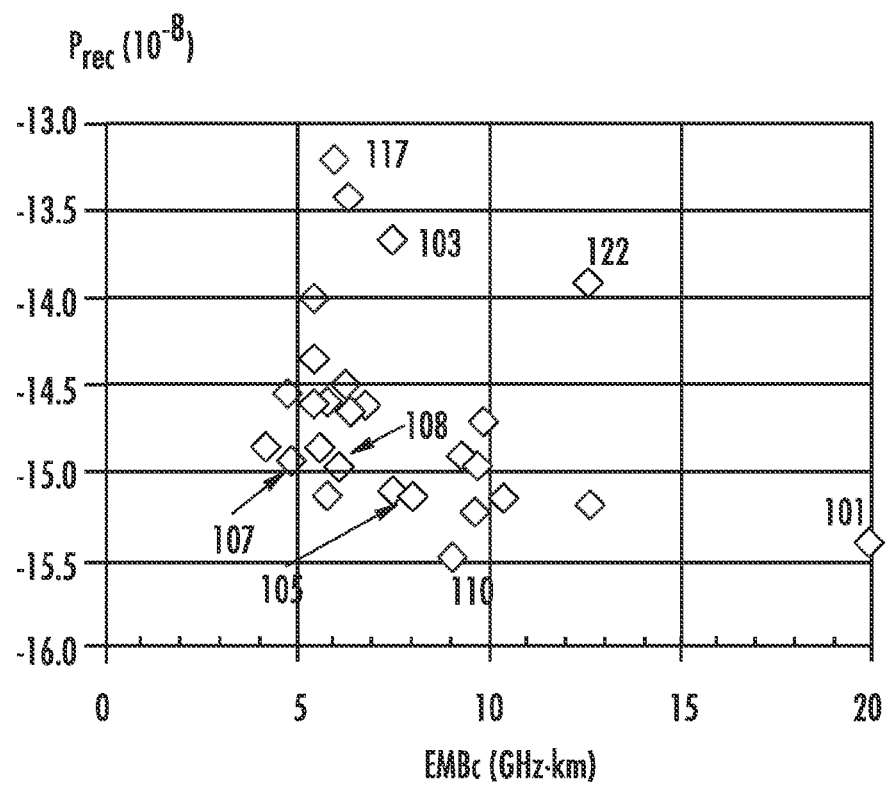
FIG. 8 graphically represents a correlation between the sensitivity of the system and the effective modal bandwidth for multimode optical fibers according to the invention and for multimode optical fibers according to the prior art.
Figure 9:
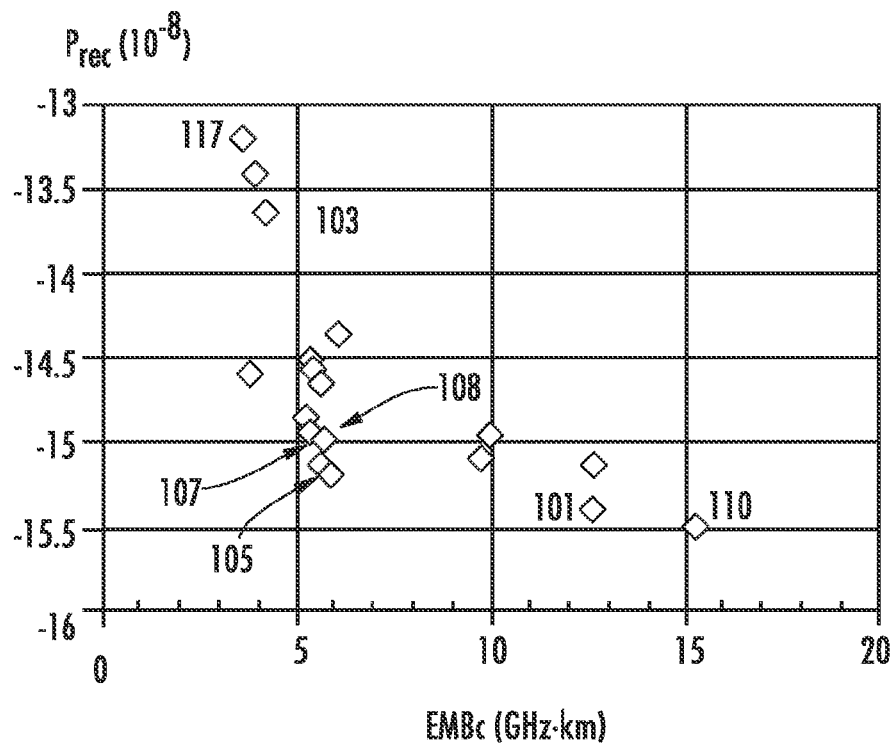
FIG. 9 graphically represents a correlation between the sensitivity of the system and the effective bandwidth of the fiber for multimode optical fibers according to the invention and for multimode optical fibers according to the prior art.

FIGS. 8 and 9 show tests illustrating the sensitivity of an optical system for multimode fibers according to whether the chromatic dispersion is taken into account (FIG. 9) or not (FIG. 8).

As noted, FIG. 8 shows the correlation between the power received ($P_{rec}$) by an optical receiver for a binary error rate (BER) of $10^{-8}$ and the calculated effective modal bandwidth (EMBc) without modification of the DMD graph to take into account the chromatic dispersion.

FIG. 9 shows the correlation between the power received ($P_{rec}$) by an optical receiver for a binary error rate (BER) of $10^{-8}$ and the calculated effective bandwidth (EBc) from the DMD graph modified to take into account the chromatic dispersion.

For calculation purposes, the sources in the simulations of FIGS. 8 and 9 are VCSELs with a maximum spectral width value $\Delta\lambda_{max}$ of 1.1 nanometers and a fiber length L of 750 meters. The calculation of the delay $\Delta t_{trace}$ uses a chromatic dispersion value D of −100 ps/(nm·km).

Those having ordinary skill in the art will appreciate that, typically, the BER is a function of the bandwidth of the fiber. There is a strong theoretical correlation between the two. The bandwidth is the result of the chromatic dispersion and the modal dispersion. When the source is defined, the value of the chromatic dispersion bandwidth is fixed. It is therefore expected that the binary error rate will no longer be a function only of the modal dispersion. Two fibers having the same modal dispersion but a different alpha, for example, should have the same BER.

In this regard, FIG. 8 shows that two fibers having the same EMBc value have significantly different penalties (e.g., fibers 117 and 103 versus fibers 105, 107 and 108). Similarly, fiber 101, which clearly has an EMBc value greater than the others, does not have a better system performance than fiber 110. Therefore, the selection of multimode fibers solely according to the effective modal bandwidth (EMB) criterion is not the most favorable for system applications using polychromatic sources having multiple transverse modes.

The fact of "simulating" the effect of the chromatic dispersion, knowing the coupling mechanism between a VCSEL and a multimode fiber, by artificially modifying the delay times on the DMD graph according to the formula:

$$\Delta t_{trace} = \Delta\lambda_{max} \times D \times L \left(\frac{r_{trace}}{a}\right)^{\beta}$$

makes it possible to effectively compensate for the modal dispersion induced by the chromatic dispersion in order to achieve (i) an equivalent modal dispersion value at the end of the fiber of less than 0.11 ps/m and (ii) an effective bandwidth greater than 6000 MHz·km.

Comparatively, FIG. 9 shows that fibers 103 and 117 have a narrower effective bandwidth EB than fibers 105, 107 and 108. This proves, in fact, that their respective system performances are not as good. This is not apparent from FIG. 8, however, in which fibers 103, 105, 107, 108 and 117 all have substantially equal bandwidths (i.e., the fibers would have been considered to be of the same quality.)

Similarly, in FIG. 9, fibers 101 and 110 have close bandwidth values for similar system performance. This is not the case in FIG. 8 where fiber 101 appears to be clearly better than fiber 110.

The present invention, therefore, makes it possible to select multimode optical fibers having optimum system performances. The selection of the fibers can take place in the following manner:

Multimode optical fibers are manufactured according to any known technique. Each multimode optical fiber has a graded-index profile with a given value of parameter α. A measurement of the dispersion modal delay is carried out for each fiber, starting with a DMD graph plotted for each fiber. This modal dispersion can be measured according to the recommendations of the standard FOTP-220 (i.e., the modal dispersion $DMD_{inner\&outer}$ is measured at a quarter of the height of the leading edge of the first trace and at a quarter of the height of the trailing edge of the last trace).

Each DMD graph of each fiber is then modified by adding a delay $\Delta t_{trace}$ to each trace:

$$\Delta t_{trace} = \Delta\lambda_{max} \times D \times L \left(\frac{r_{trace}}{a}\right)^{\beta}$$

wherein, $r_{trace}$ is the center position of the injection of the light pulse corresponding to the trace;

a is the core radius of the multimode fiber;

D is the chromatic dispersion of the multimode fiber at the wavelength of the light pulse; and $\Delta\lambda_{max}$ is the maximum spectral width of the source intended to be used with the fiber.

Subsequently, the multimode optical fibers having an equivalent modal dispersion value measured on the modified DMD graph of less than 0.11 ps/m are selected. The use of such fibers makes it possible to produce high-speed Ethernet transmission networks over great distances having very good performances (e.g., with a distance by Gigabit Ethernet speed product greater than 3000 Gb/s·m.)

The present invention is not limited to the foregoing exemplary embodiments. In particular, it is within the scope of the present invention to employ a fiber in combination with any type of a polychromatic source other than a VCSEL possessing several transverse modes, such as light-emitting diodes (LEDs).

This application incorporates entirely by reference the following commonly assigned patent application publication and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. patent application Ser. No. 12/267,732 for a Microbend-Resistant Optical Fiber, filed Nov. 10, 2008, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Patent Application Publication No. US2007/0280615 A1 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Patent Application Publication No. US2008/0152288 A1 for an Optical Fiber (Flammer et al.); U.S. patent application Ser. No. 12/098,804 for a Transmission Optical Fiber Having Large Effective Area (Sillard et al.), filed Apr. 7, 2008; U.S. patent application Ser. No. 12/418,523 for a Dispersion-Shifted Optical Fiber (Sillard et al.), filed Apr. 3, 2009; U.S. patent application Ser. No. 12/436,423 for a Single-Mode Optical Fiber Having Reduced Bending Losses, filed May 6, 2009, (de Montmorillon et al.); U.S. patent application Ser. No. 12/436,484 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. Patent Application No. 61/101,337 for a Bend-Insensitive Optical Fiber, filed Sep. 30, 2008, (de Montmorillon et al.); U.S. Patent Application No. 61/112,006 for a Bend-Insensitive Single-Mode Optical Fiber, filed Nov. 6, 2008, (de Montmorillon et al.); and U.S. Patent Application No. 61/112,374 for a Bend-Insensitive Single-Mode Optical Fiber, filed Nov. 7, 2008, (de Montmorillon et al.).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); International Patent Application Publication No. WO 2007/013923 A2 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Patent Application Publication No. US2007/0183726

A1 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Patent Application Publication No. US2008/0145010 A1 for a Gel-Free Buffer Tube with Adhesively Coupled Optical Element (Overton et al.); U.S. Patent Application Publication No. US2008/0181564 A1 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. patent application Ser. No. 12/391,327 for a Buffer Tube with Hollow Channels, filed Feb. 24, 2009, (Lookadoo et al.); and U.S. patent application Ser. No. 12/466,965 for an Optical Fiber Telecommunication Cable, filed May 15, 2009.

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A multimode optical fiber, wherein the multimode fiber possesses a refractive index profile such that a measurement of the dispersion modal delay (DMD), the DMD graph of which has been modified by adding a delay ($\Delta t_{trace}$) to each trace:

$$\Delta t_{trace} = \Delta \lambda_{max} \times D \times L \left( \frac{r_{trace}}{a} \right)^{\beta}$$

where $r_{trace}$ is the center position of the injection of the light pulse corresponding to the trace,
a is the core radius of the multimode optical fiber,
L is the length of the multimode optical fiber,
D is the chromatic dispersion of the multimode fiber at the wavelength of the light pulse,
$\beta$ is the coefficient of the delay, and
$\Delta \lambda_{max}$ is the maximum spectral width of a source intended to be used with the fiber,
gives an equivalent modal dispersion value ($DMD_{inner\&outer}$), measured at a quarter of the height of the leading edge of the first trace and at a quarter of the height of the trailing edge of the last trace, of less than 0.11 ps/m for ($\Delta \lambda_{max} \times D$)>0.07 ps/m.

2. The multimode optical fiber according to claim 1, wherein the multimode optical fiber has chromatic dispersion between $-80$ ps/(nm·km) and $-120$ ps/(nm·km) for wavelengths between 840 nanometers and 860 nanometers.

3. The multimode optical fiber according to claim 1, wherein the coefficient of the delay ($\beta$) is equal to 1.

4. The multimode optical fiber according to claim 1, wherein the coefficient of the delay ($\beta$) is greater than 1.

5. The multimode optical fiber according to claim 1, wherein the coefficient of the delay ($\beta$) is equal to 2.

6. The multimode optical fiber according to claim 1, wherein a calculated effective bandwidth (EBc) is greater than 6000 MHz-km.

7. The multimode optical fiber according to claim 1, wherein the multimode optical fiber has a graded-index profile.

8. An optical system, comprising:
a polychromatic optical source for emitting multiple transverse modes having a maximum spectral width ($\Delta \lambda_{max}$); and
an optical link comprising the multimode optical fiber according to claim 1.

9. The optical system according to claim 8, wherein the polychromatic optical source has a maximum spectral width ($\Delta \lambda_{max}$) between 1 nanometer and 2 nanometers.

10. The optical system according to claim 8, wherein the polychromatic optical source is a surface emitting laser (VCSEL) or a light-emitting diode (LED).

11. The optical system according to claim 8, wherein the optical system has a distance by Gigabit Ethernet rate product greater than 3000 Gb/s·m.

12. A multimode optical fiber having a graded-index profile, wherein:
the multimode optical fiber has a calculated effective bandwidth (EBc) greater than 6000 MHz-km;
at wavelengths between 840 nanometers and 860 nanometers, the multimode optical fiber has a chromatic dispersion between $-80$ ps/(nm·km) and $-120$ ps/(nm·km); and
the multimode optical fiber has an equivalent modal dispersion value ($DMD_{inner\&outer}$) of less than 0.11 ps/m for ($\Delta \lambda_{max} \times D$)>0.07 ps/m as measured on a DMD graph;
wherein the DMD graph is modified by adding a delay ($\Delta t_{trace}$) to each trace:

$$\Delta t_{trace} = \Delta \lambda_{max} \times D \times L \left( \frac{r_{trace}}{a} \right)^{\beta}$$

wherein,
$r_{trace}$ is the center position of the injection of the light pulse corresponding to the trace,
a is the core radius of the multimode optical fiber,
L is the length of the multimode optical fiber,
D is the chromatic dispersion of the multimode fiber at the wavelength of the light pulse,
$\beta$ is the coefficient of the delay, $\beta$ being greater than or equal to 1, and
$\Delta \lambda_{max}$ is the maximum spectral width of a source intended to be used with the fiber; and
wherein the equivalent modal dispersion value ($DMD_{inner\&outer}$) is measured on the modified DMD graph at a quarter of the height of the leading edge of the first trace and at a quarter of the height of the trailing edge of the last trace.

13. A method for selecting multimode optical fibers, comprising:
manufacturing multimode optical fibers, each multimode optical fiber having a graded-index profile of a given value of parameter $\alpha$;
measuring the dispersion modal delay on a DMD graph plotted for each multimode optical fiber, wherein the modal dispersion ($DMD_{inner\&outer}$) is measured at a quarter of the height of the leading edge of the first trace and at a quarter of the height of the trailing edge of the last trace;

modifying the DMD graph of each fiber by adding a delay ($\Delta t_{trace}$) to each trace:

$$\Delta t_{trace} = \Delta \lambda_{max} \times D \times L \left( \frac{r_{trace}}{a} \right)^{\beta}$$

where $r_{trace}$ is the center position of the injection of the light pulse corresponding to the trace, a is the core radius of the multimode optical fiber, D is the chromatic dispersion of the multimode optical fiber at the wavelength of the light pulse, and $\Delta \lambda_{max}$ is the maximum spectral width of a source intended to be used with the multimode optical fiber; and selecting those multimode optical fibers having an equivalent modal dispersion value of less than 0.11 ps/m as measured on the modified DMD graph.

14. A method for selecting multimode optical fibers according to claim 13, wherein, at wavelengths between 840 nanometers and 860 nanometers, the selected multimode optical fibers have chromatic dispersion between −80 ps/(nm·km) and −120 ps/(nm·km).

15. A method for selecting multimode optical fibers according to claim 13, wherein the selected multimode optical fibers have a calculated effective bandwidth (EBc) greater than 6000 MHz-km.

* * * * *